(12) United States Patent
Ristoski

(10) Patent No.: US 9,988,172 B2
(45) Date of Patent: Jun. 5, 2018

(54) BAG HOLDER AND TRANSPORT CART

(71) Applicant: Nebojsa Ristoski, Macomb, MI (US)

(72) Inventor: Nebojsa Ristoski, Macomb, MI (US)

(*) Notice: Subject to any disclaimer, the term of this patent is extended or adjusted under 35 U.S.C. 154(b) by 0 days. days.

(21) Appl. No.: 15/331,190

(22) Filed: Oct. 21, 2016

(65) Prior Publication Data
US 2017/0113826 A1 Apr. 27, 2017

Related U.S. Application Data

(60) Provisional application No. 62/244,807, filed on Oct. 22, 2015.

(51) Int. Cl.
B65B 67/12 (2006.01)
B65F 1/14 (2006.01)
B62B 1/14 (2006.01)
B62B 1/26 (2006.01)

(52) U.S. Cl.
CPC ............ B65B 67/1205 (2013.01); B62B 1/14 (2013.01); B65B 67/12 (2013.01); B65B 67/1233 (2013.01); B65F 1/1415 (2013.01); B65F 1/1468 (2013.01); B62B 1/264 (2013.01); B62B 1/266 (2013.01); B62B 2202/20 (2013.01); B62B 2202/22 (2013.01); B62B 2202/404 (2013.01); B62B 2203/44 (2013.01); B65B 67/1238 (2013.01); B65F 1/141 (2013.01); B65F 2240/138 (2013.01)

(58) Field of Classification Search
CPC ............ B65B 67/1255; B65B 67/1238; B65B 67/1205; B65B 67/1233; B65B 67/12; B65F 1/1468; B65F 1/1473; B65F 1/141; B65F 1/1415; B62B 2202/22; B62B 1/12; B62B 2202/404; B62B 1/14; B62B 1/266; B62B 2203/44; B62B 1/264; B62B 3/104; B62B 3/106; F16L 33/12
USPC ..................................... 248/95–99
See application file for complete search history.

(56) References Cited

U.S. PATENT DOCUMENTS

| 191,502 | A | * | 5/1877 | Wing | B67D 7/04 141/231 |
| 199,051 | A | * | 1/1878 | Johnson | 248/98 |
| 445,195 | A | * | 1/1891 | Pendery, II | B65B 67/12 248/101 |
| 1,025,974 | A | * | 5/1912 | Gipple | B65B 67/12 248/101 |

(Continued)

Primary Examiner — Stanton L Krycinski
Assistant Examiner — Taylor L Morris
(74) Attorney, Agent, or Firm — Varnum, Riddering, Schmidt & Howlett LLP

(57) ABSTRACT

A bag holder is capable of holding a bag in an upright position with the use of expanding arms and a unique two stage hinge and clamp mechanism, which allows the expanding arm apparatus to enter and clamp a refuse bag quickly and efficiently. The operation utilizes a hook mechanism and a clamp, which allows the operator to use one hand to manipulate the expanding arm apparatus and the other hand to position the refuse bag. In addition, the bag holder functions as transport cart for refuse bags. Also, the unique cart structure, allows storing of two garden tools and multiple refuse bags. The bag holder is able to fold onto itself and be stored on a hook, by the unique handle. The bag expander and clamp mechanism is detachable which can be adapted to existing dolly's or hand truck.

20 Claims, 8 Drawing Sheets

(56) References Cited

U.S. PATENT DOCUMENTS

| | | | | |
|---|---|---|---|---|
| 1,158,013 A | * | 10/1915 | Vonderahe | B65B 67/12 248/99 |
| 1,519,698 A | * | 12/1924 | Person | B65B 67/1255 248/100 |
| 2,064,696 A | * | 12/1936 | Smith | A01K 97/20 224/406 |
| 2,236,053 A | * | 3/1941 | Caron | B62B 1/06 280/47.26 |
| 2,383,366 A | * | 8/1945 | Broome | B65B 67/1255 248/100 |
| 2,483,844 A | * | 10/1949 | Ranseen | B65B 67/1227 248/99 |
| 2,612,865 A | * | 10/1952 | Macaulay | A47B 23/042 248/462 |
| 2,619,360 A | * | 11/1952 | Alter | B62B 1/045 280/13 |
| 2,806,711 A | * | 9/1957 | Jacobs | B62B 1/262 211/70 |
| 3,079,166 A | * | 2/1963 | Abgarian | B62B 1/045 248/96 |
| 3,387,346 A | * | 6/1968 | Hasenbank | A01D 43/06 24/270 |
| 3,754,771 A | * | 8/1973 | Shagoury | B65B 67/1205 248/98 |
| 3,815,767 A | * | 6/1974 | Lund | B62B 1/264 280/47.18 |
| 3,893,699 A | * | 7/1975 | Morris | B62B 3/106 248/98 |
| 3,992,034 A | * | 11/1976 | Smith, Sr. | B62B 1/12 248/98 |
| 4,124,185 A | * | 11/1978 | Preisinger | B62B 1/14 248/101 |
| 4,312,489 A | * | 1/1982 | Paetzold | B65B 67/12 248/97 |
| 4,319,726 A | * | 3/1982 | Andersson | B65B 67/12 171/43 |
| 4,452,468 A | * | 6/1984 | Eads | B62B 1/12 248/98 |
| 4,660,870 A | * | 4/1987 | Donley | F16L 33/12 24/273 |
| 4,917,393 A | * | 4/1990 | Rogers | B62B 1/12 248/129 |
| 4,940,201 A | * | 7/1990 | Kurth | B65B 67/12 248/101 |
| 5,183,227 A | * | 2/1993 | Wilhite | B65B 67/1205 248/99 |
| 5,190,260 A | * | 3/1993 | Daubenspeck | F24H 9/06 248/146 |
| 5,456,431 A | * | 10/1995 | Ilnisky | B62B 3/02 248/150 |
| 5,588,622 A | * | 12/1996 | Gordon, Sr. | B65B 67/1238 24/30.5 R |
| 5,906,302 A | * | 5/1999 | Spergel | A62B 25/00 224/250 |
| 5,947,351 A | * | 9/1999 | Garofalo | A45F 3/04 224/153 |
| 5,957,472 A | * | 9/1999 | Borgatti | B62B 1/12 280/30 |
| 6,131,861 A | * | 10/2000 | Fortier, Jr. | B62B 1/266 248/100 |
| 6,273,156 B1 | * | 8/2001 | Carrillo | B65B 67/12 141/108 |
| 6,367,822 B1 | * | 4/2002 | Hutchins | B62B 1/10 248/99 |
| 6,382,573 B1 | * | 5/2002 | Cepeda | B65B 67/1205 248/150 |
| 6,513,816 B1 | * | 2/2003 | Kijima | B62B 5/0083 280/47.26 |
| 6,637,938 B2 | * | 10/2003 | Watkins | D06F 95/004 248/99 |
| 6,994,302 B1 | * | 2/2006 | Simmons | B65B 67/1238 141/390 |
| 7,416,195 B2 | * | 8/2008 | Zwack | B62B 1/264 280/43.1 |
| 7,461,821 B2 | * | 12/2008 | Cheng | B65B 67/1233 24/30.5 R |
| 7,588,225 B2 | * | 9/2009 | Wawerski | B44D 3/14 16/425 |
| 7,686,260 B1 | * | 3/2010 | Tetradis | B62B 1/142 248/98 |
| 8,011,634 B1 | * | 9/2011 | Johnson | A61G 5/10 224/434 |
| 8,590,906 B1 | * | 11/2013 | Sanchez | B62B 5/0083 248/96 |
| 8,789,836 B2 | * | 7/2014 | Umbro | B62B 1/042 280/47.26 |
| 2004/0222333 A1 | * | 11/2004 | Quick | B65F 1/1415 248/99 |
| 2009/0014979 A1 | * | 1/2009 | Snook | B62B 1/14 280/200 |
| 2009/0152825 A1 | * | 6/2009 | Adams | B62B 1/14 280/47.31 |
| 2009/0230258 A1 | * | 9/2009 | McFadden | B65B 67/1233 248/101 |
| 2009/0256034 A1 | * | 10/2009 | Poyner | B01F 15/00733 248/154 |
| 2010/0314507 A1 | * | 12/2010 | Laitila | B65B 67/1227 248/97 |
| 2012/0049474 A1 | * | 3/2012 | Del Rosario | B62B 1/008 280/47.34 |

* cited by examiner

BAG HOLDER AND TRANSPORT CART

CROSS-REFERENCE TO RELATED APPLICATIONS

This application claims the benefit of U.S. Provisional Patent Application Ser. No. 62/244,807 entitled "BAG HOLDER AND TRANSPORT CART" filed on Oct. 22, 2015, which is hereby incorporated by reference in its entirety.

FIELD OF INVENTION

This invention relates to a device and method for holding a bag, such as a refuse bag, in an open and upright position and transportation of such bag.

BACKGROUND

Bags, such as lawn waste or refuse bags, are commonly used to hold various types of waste or refuse, such as lawn waste, garbage, or other types of trash or recyclable materials. Such bags are commonly made of a paper or plastic material. One challenge that users of such bags face is keeping the bag open, specifically when the bag is first used. Further, users face challenges in both keeping such bags open and upright, as well as transporting bags that are filled.

Various solutions have been proposed for use of refuse bags, however these solutions all have shortcomings. Some solutions use multiple movements required to secure the refuse bag with various types of clamps. Some products clamp the refuse bag with an inner and outer ring. This limits the size of refuse bags that can be used, and is both cumbersome to secure and takes much longer to attach a refuse bag. Other devises can't adapt to existing hand trucks, dollies or hand carts making transportation difficult. Some product use large rubber band to hold the bags, which is cumbersome. Other products hold from inside with spring like mechanism to hold open, however it does not have a latch mechanism to keep it closed for ease of insertion and do not adjust to different diameter bags.

Various other proposed designs also suffer from deficiencies, such as failing to open the refuse bag fully, lacking self-standing capabilities, lacking portability, and failing to be compatible with a broad range of bags.

Accordingly, an improved refuse bag holder and transportation device and method are needed in the industry.

SUMMARY

A bag holder assembly is generally presented. The bag holder assembly includes a clamp plate and a hinge arm pivotally connected to the clamp plate. An expanding arm apparatus is connected to the rotatable hinge arm. The expanding arm apparatus is expandable and contractible between an expanded position, forming a larger opening, and a contracted position, forming a smaller opening. The expanding arm apparatus includes a first spring arm connected to a first end of the hinge arm and a second spring arm connected to a second end of the hinge arm. The spring arms are arranged to generally form and opening on the interior of the expanding arm apparatus and configured to apply a biasing force to bias the expanding arm apparatus toward expanded position and. A strap is positioned to interconnect the ends of the first and second spring arms and form a closed loop between the hinge arm, the first and second spring arms, and the strap. A latch is provided to connect the first spring arm directly to the second spring arm. The latch may comprise a hook arm and a striker arm. In contracted position, the latch may be connected to directly connect the first and second spring arms. In expanded position, the latch may be open to allow the strap to fully expand.

In an embodiment, the bag holder assembly includes a pre-clamp connected to the clamp plate. The pivot clamp may be pivotable with respect to the clamp plate and may be biased toward the clamp plate.

In an embodiment, the bag holder may be connected to a cart to form a bag holder cart assembly. The cart may comprise a frame to which the bag holder may be connected, such as clamped there to by clamp arms. The cart may include wheels to allow for portability. The cart may further include a base plate connected near the bottom of the frame. The base plate may be rotatable between a down and up position to allow for storage.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A refuse bag holder 10 is generally presented. The refuse bag holder 10 is configured to hold a refuse bag there in, in an open and upright position. As described in further detail below, the refuse bag holder 10 may be capable of easily transporting the refuse bag to a given location without spilling or damaging the bag or contents.

Figure 1:
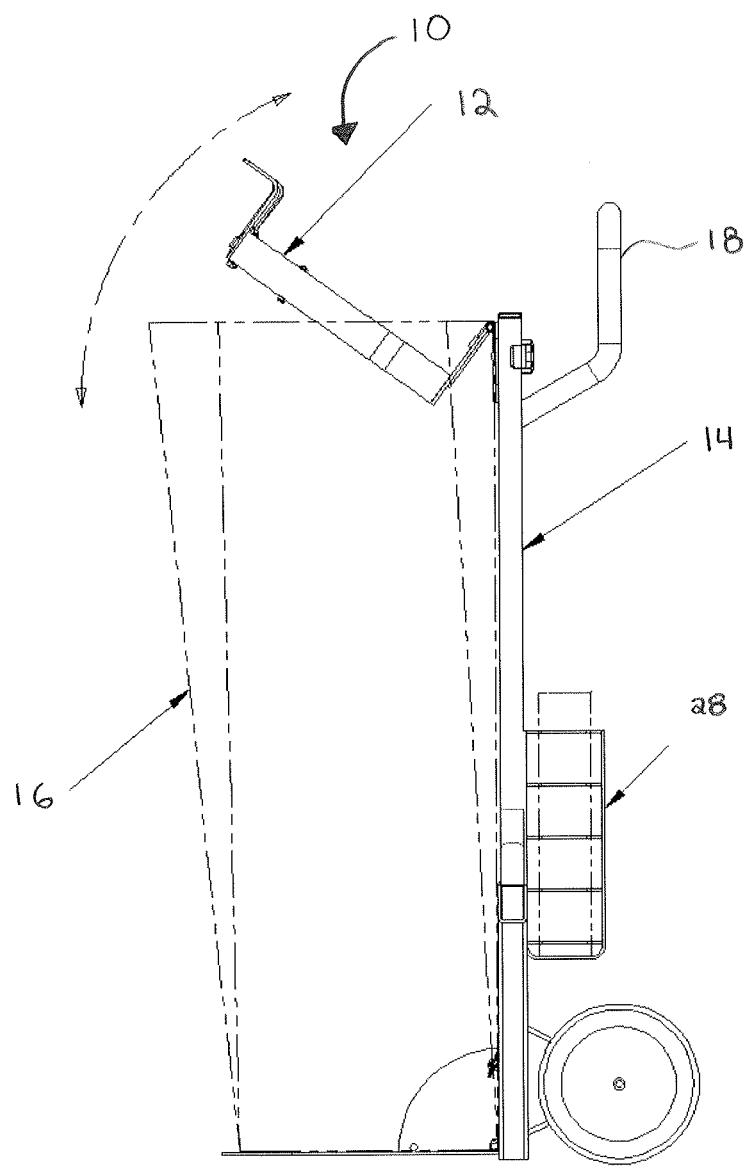
FIG. 1 illustrates an elevated side view of an embodiment of a refuse bag holder.

FIG. 1 illustrates the major components of the refuse bag holder 10, as well as how a refuse bag 16 may be used and stored with the bag holder 10. The refuse bag holder 10 may generally include a bag holder apparatus 12 and a cart portion 14, connected or integrated together. The cart 12 may comprise a frame, such as a custom built frame, that is uniquely shaped and manufactured by connecting or welding components, such as steel components, together. The bag holding 12 apparatus is positioned at or near the top of the cart, as shown in FIG. 1. The bag holding apparatus 12 is configured to hold a refuse bag 16 therein, as described in further detail below. The cart 14 may include a handle 18 that is ergonomically designed and shaped to allow the bag holder apparatus 12 to pivot up during use. Specifically, the handle 18 may extend away from the bag holder apparatus 12 to allow room for the bag holder apparatus 12 to pivot upwards, as illustrated in FIG. 1. In an embodiment, the bag holder apparatus 12 may be removable from the cart 14 or reconnectable to the cart 14.

The cart frame 14 may include an axle 20 positioned near the bottom of the frame. The axle 20 may extend across the span of the frame and house wheels 22, located on either side of the cart frame. The wheels 22 allow easy transportation of the cart.

A folding base 24 may be located at or near the bottom of the cart frame 14. The base 24 may extend away from the cart frame 14 at an angle of approximately 90 degrees with respect to the frame 14. The base 24 may be positioned near to the ground that is supporting the wheels 22. The base 24 may include two side plates 26 positioned on either end of the base 24. The side plates 26 may be arranged perpendicular to the base 24 and may help to prevent refuse bags 16 or other carried items from sliding side-to-slide when positioned on the base 24. The base plate 24 may pivot with respect to the cart frame 14 between a stow position when up and a use position when down. The side plates 26 may include one or more lock-out pin holes to lock the base 24 in the use position and/or in the storage position.

The cart may include a basket 28, such as a wire mesh basket, to store unused and folded refuse bags. The basket 28 may be welded or otherwise connected to the cart frame 14.

Figure 2:
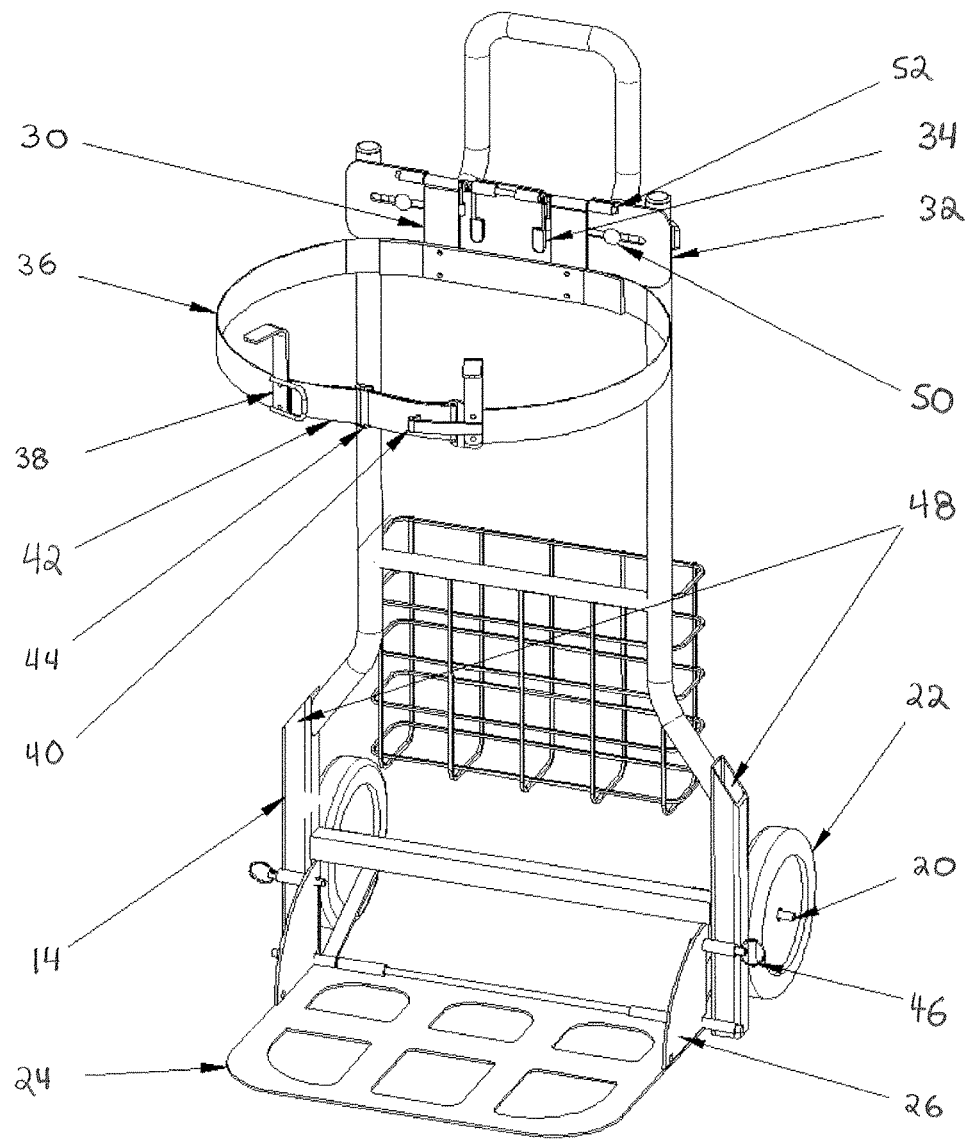
FIG. 2 illustrates an isometric front view of an embodiment of a refuse bag holder.

With reference to FIG. 2, the bag holder apparatus 12 may comprise various components to hold the bag in an open and upright position. To that end, the bag holder apparatus 12 may include a hinge arm 30. The hinge arm 30 may be configured to serve multiple functions, including pivoting up with respect to the cart frame 14 to an up position, and pivoting down with respect to the cart frame 14 to a closed position. When in up position, a refuse bag 16 may be positioned under the bag holder apparatus 12, then the apparatus 12 may be lowered back down into the bag by pivoting the hinge arm 30 back down.

The holder apparatus 12 may further include a clamp plate 32 connected to an upper portion of the cart frame 14. The clamp plate 32 may house a pre-clamp 34, connected thereto. The pre-clamp 34 may comprise a spring loaded or biased clamping device configured to apply a force to the clamp plate 32 to hold a bag in position before it is locked in place. The pre-clamp 34 may be configured as one or more prongs, such as the two-prong design shown in FIG. 2, or as a plate or other geometric design capable of applying a pressure onto the bag. When the hinge arm 30 is pivoted, it may act to push or move the pre-clamp 34 to an up position. For example, a tab may extend from the pre-clamp 34 and be positioned to catch the hinge arm 30 as it pivots up. When the hinge arm 30 is moved to the up position, it may catch the tap and move the pre-clamp 34 to the up position as well. When the hinge arm 30 is returned to the down position, the pre-clamp 34 returns down to clamping position, as described in further detail below.

An expanding arm apparatus 36 is connected to the hinge arm 30. The expanding arm apparatus 36 may be made of an appropriate material, such as a spring-like material, that is able to collapse to fit inside of a bag and also able to expand to hold the bag open. The expanding arm apparatus 36 may be any appropriate shape, such as generally circular or ovular to fit inside a similarly shaped bag opening. The expanding arm apparatus 36 may comprise one or more arm portions, such as two arm portions, each made of the spring-like material. The arm portions may be pulled inward to give the expanding arm apparatus 36 a smaller perimeter or circumference, or may be released or expanded out to give the expanding arm apparatus 36 a greater perimeter or circumference.

A striker handle 38 and hook handle 40 may be positioned on an outer side of the expanding arm apparatus 36, near the end of the arms. The striker handle 38 and hook handle 40 may connect together to hold the expanding arm apparatus 36 in collapsed position. The striker handle 38 may include a looped portion and the striker handle 40 may include a hooked portion configured to connect to the looped portion. The spring arms of the expanding arm apparatus 36 may consistently apply a force pushing the apparatus 36 open towards an expanded position. However, when connected together, the striker handle 38 and hook handle 40 may hold the apparatus 36 in collapsed position. When the hook handle 40 is released from the striker handle 38, the expanding arm apparatus 36 will spring open into expanded position, as shown in FIG. 2.

A strap 42 may interconnect the outer ends of the spring arms of the expanding arm apparatus 36. The strap 42 may be formed of a flexible material. The length of the strap 42 may determine how far the apparatus 36 is able to open. The length of the strap 42 may be adjustable using the strap slide 44 to adjust the size of the apparatus in expanded position, based on the bag opening size. The strap 42 may be configured to always fold inward when the expanding arm apparatus 36 is in collapsed position.

In use, The striker handle 38 may be connected to the hook handle 40 to hold the expanding arm apparatus in collapsed position. A bag may be placed under the apparatus 12 and the collapsed expanding arm apparatus 36 may be pivoted and placed in the bag opening. The bag may be held in the pre-clamp. The hook handle 40 may then be released from the striker handle 38 to allow the expanding arm apparatus to expand and hold the bag opening open. The described design may provide a functional benefit over other devices by allowing simultaneous clamping of the bag by the pre-clamp 34 and hinge arm 30 and expanding of the expanding arm apparatus 36 to hold the bag in place.

The cart frame 14 may comprise the main structure and may hold the main sub-assemblies and components described herein. The cart frame 14 may be made of welded construction using metal components. As described above, the base plate 24 is the bottom support for the bag in the vertical direction, mainly for transportation. The side plates 26 that retain the bag also act as the latch mechanism for securing the base plate 24 into the work and stored position. Pull pins 46 may extend through openings in the side plates 26 to fix the base plate 24 into the desired position with respect to the frame 14. The pull pins 46 have an expanding ball to retain the pin and the side plates 26 in the work or stored position.

The axle 20 may be held in position with end caps at each end. The wheels 22 may be connected to the axle 20 on the side of the frame opposite the base plate 24 and may allow the cart to roll smoothly.

The frame 14 may include tubes 48 positioned near the bottom of the frame 14. The tubes 48 may be designed specifically with openings 14 to allow storage of tools, such as garden tools, and the like.

The clamp plate 32 positioned near the top of the frame 14 provides a base for both clamping the bag and attaching components thereto. One or more carriage bolts 50 extend through horizontal slots in the clamp plate 32 and connect to knobs 56 on the opposite side of the clamp plate 32. The knobs 56 may tighten or loosen the clamp plate 32 connection and allow the clamp plate 32 to be moved or adjusted on the frame 14. The clamp plate 32 engages a portion of the frame 14, to attach to and swivel. The pre-clamp 34 connected to the clamp plate 32 may comprise a custom torsion spring with a tab that produces force onto the bag, in order to provide a pre-clamp preliminary force and allow a user to have one hand free during operation of the expanding arm apparatus 12. A hinge rod 52 may provide a pivot axis for the hinge arm 30.

Figure 3:
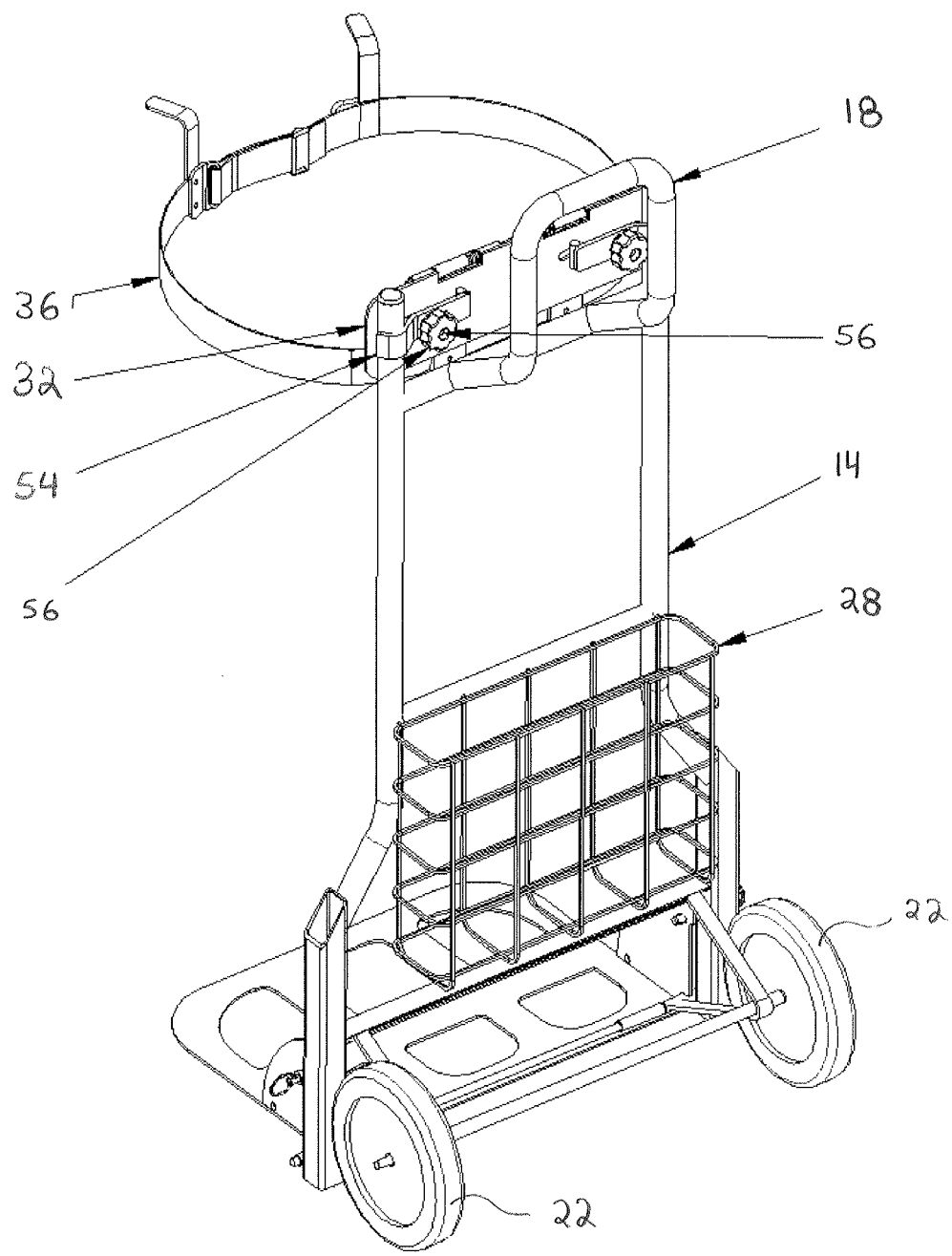
FIG. 3 illustrates an isometric rear view of an embodiment of a refuse bag holder.

A rear view of the refuse bag holder is shown in FIG. 3. As shown, a clamp arm 54 attached to the clamp plate 32 is configured to clamp onto the frame 14. The knobs 56 fasten to the carriage bolts 50, as described above, and produce a clamping force from the clamp arm 54 onto the vertical tube of the cart frame 14. The knobs 56 may be loosened to allow the entire assembly (expanding arm apparatus 36, clamp plate 32, clamp arm 54) to be adjusted up, down, or removed from the cart or may be tightened when in the appropriate position. This unique design allows the assembly to adapt to existing hand trucks or dollies for the operators that do not desire a another cart.

The handle 18 is connected to a crossbar of the frame 14 and is a uniquely shaped to provides a means for an operator to maneuver the cart while also allowing the expanding arms apparatus 36 to rotate with respect to the frame 14. For example, in an embodiment, the handle 18 may be positioned a distance away from the frame 14 to allow the expanding arm apparatus 36 to be rotated approximately 270 degrees, where the expanding arms 36 pass over and around the handle 18 as rotated back.

Figure 4:
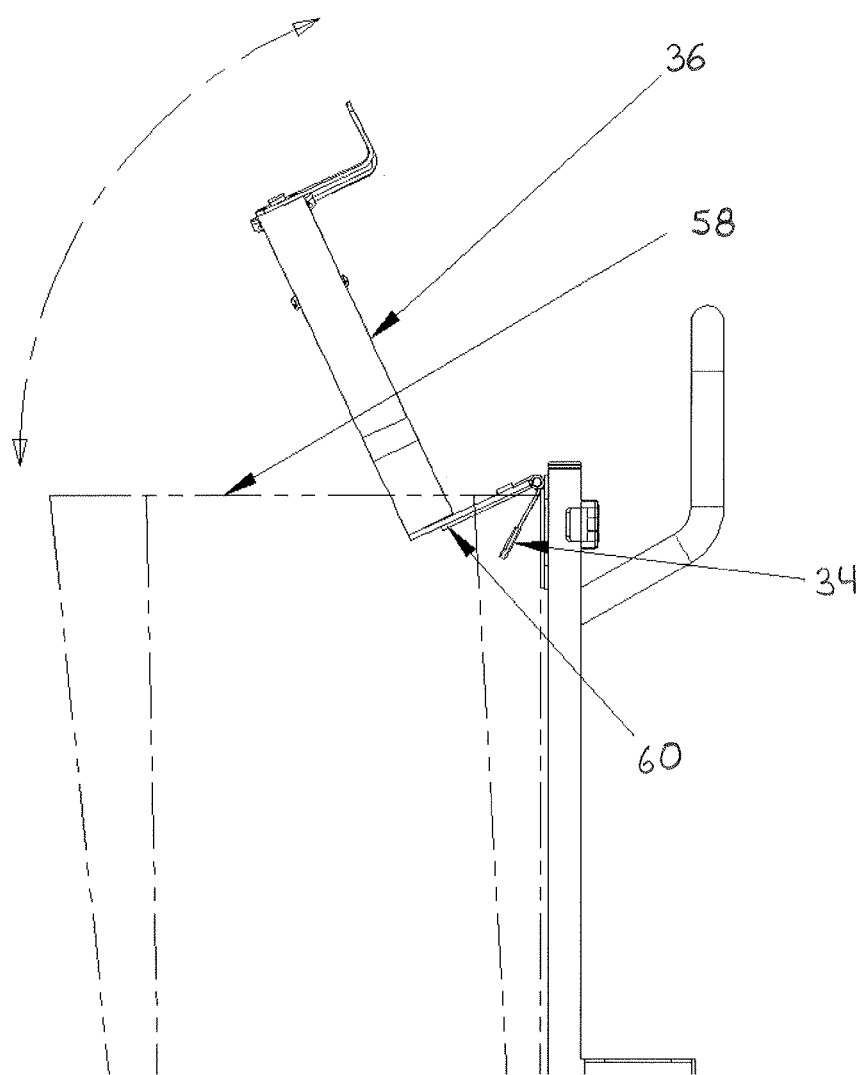
FIG. 4 illustrates a zoomed in side view of an embodiment of a bag expander mechanism.

FIG. 4 is a zoomed in side view of the top of the bag holder, showing the portion of the set-up process for attaching the refuse bag to the expanding arm apparatus 36. The pre-clamp 34 provides preliminary clamping against the clamp plate 32 to hold the bag in an upright position. This frees up one operator hand for bag manipulation. The expanding arm apparatus 36 can then pivot back down into position. As the expanding arm apparatus 36 pivots down into the refuse bag 58, the bag is clamped between the expanding arm apparatus 36 and the clamp plate 32. Clamp pads 60 on the expanding arm apparatus 36 firmly hold the refuse bag in working position and prevent slippage. The clamp pads 60 may be positioned between the clamp plate 32 and the pre-clamp 34 where the refuse bag may be clamped, such as on the outside of the clamp plate 32 and in the interior of the pre-clamp 34.

Figure 5:
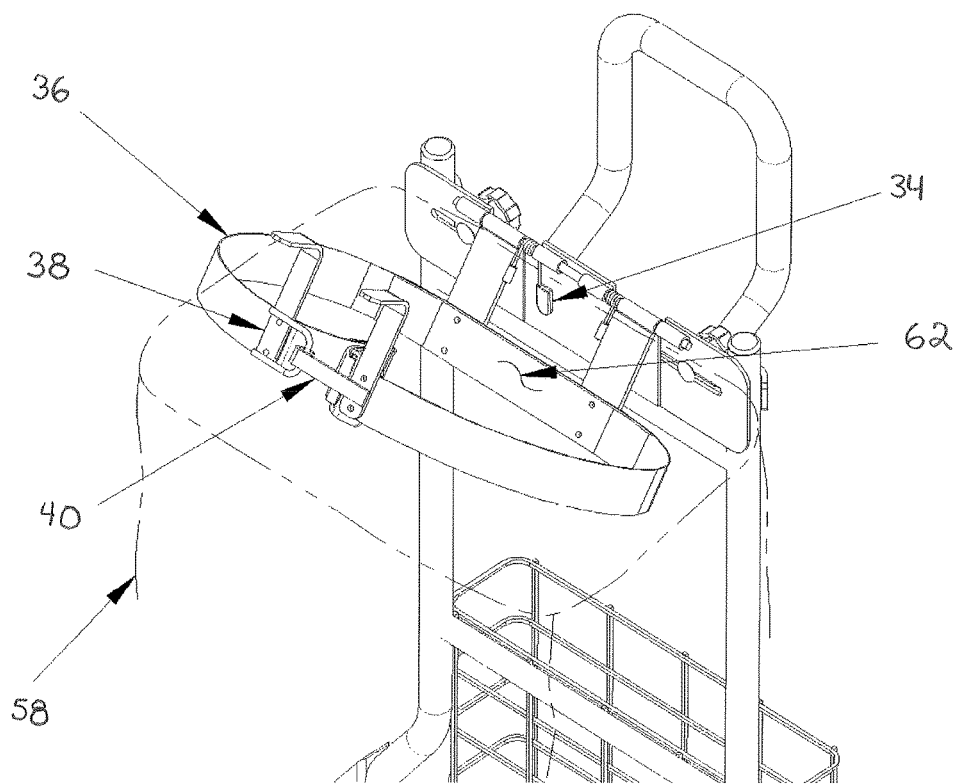
FIG. 5 illustrates a zoomed in isometric view of an embodiment of a bag expander mechanism.

FIG. 5 illustrates an isometric view of the bag holder prior to the expanding arm apparatus 36 entering the refuse bag. The expanding arm apparatus 36 may include an arm plate 62 to interconnect the spring arms at the ends opposite the strap 42 connection. The arm plate 62 may stiffen and stabilize the expanding arm apparatus 36 for ease of use and movement. At the stage shown in FIG. 5, the pre-clamp 34 may be holding the refuse bag 58 in an upright position. The hook handle 40 is shown engage to the striker handle 38 which hold the expanding arm apparatus 36 in a retracted or collapsed position to allow it to fit into the bag opening. This allows the operator to use one hand to maneuver the pivot action of the expanding arm apparatus 36 and use the other hand to manipulate the refuse bag 58 in position.

Figure 6:
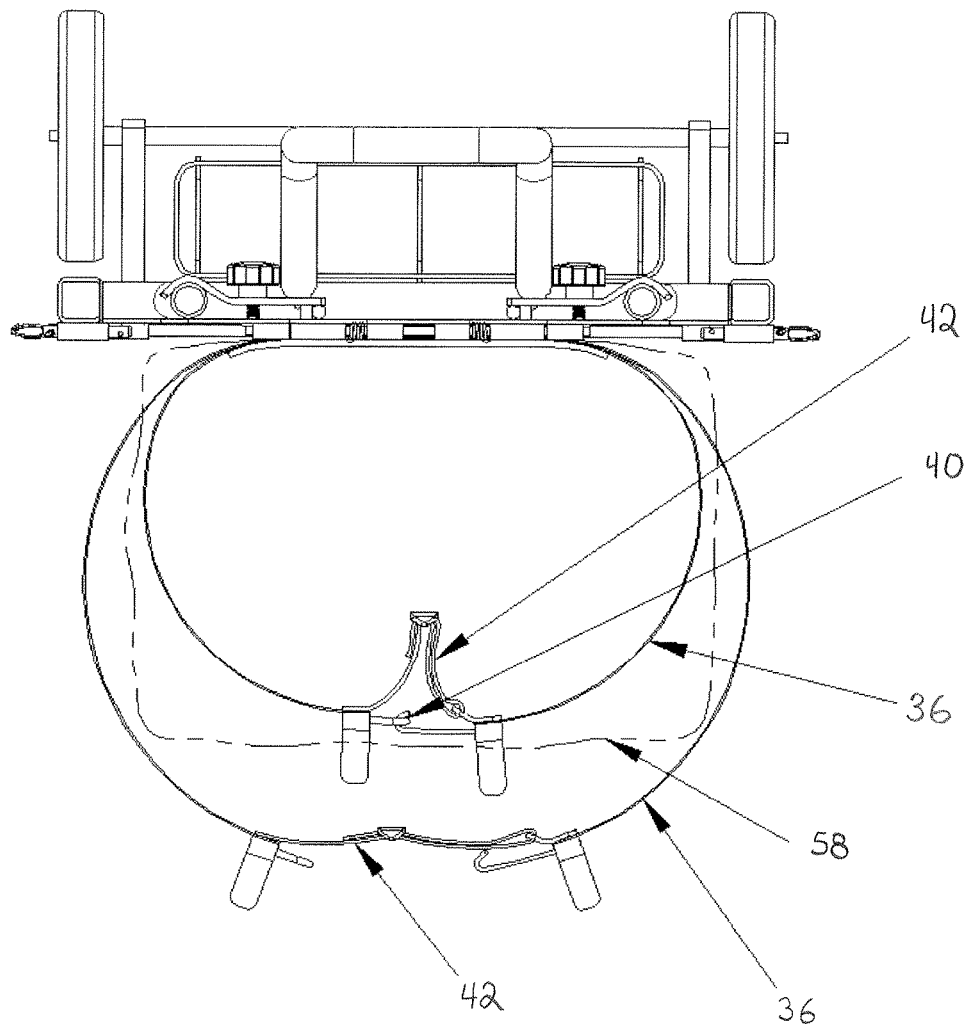
FIG. 6 illustrates a top view showing the open and close conditions of an embodiment of a bag expander.

FIG. 6 illustrates a top view of the bag holder, which shows the expanding arm apparatus 36 both positions, namely both in collapsed position in open position. The two states of the expanding arm apparatus 36 are superimposed over the bag 58 opening to show the size relationship between the expanding arm apparatus 36 in each state and the bag opening in its normal state. The expanding arm apparatus 36 in collapsed position is small enough to be able to fit inside of the refuse bag. The expanding arm apparatus 36 in open position is much larger, such as larger than the bag opening, and able to hold the refuse bag 58 open by creating an outward force and friction between the expanding arms 36 and the refuse bag 58.

The strap is shown both as a strap 42 in collapsed and folded position, and a strap 42 in open and expanded position. The strap 42 is designed to fold inward when in collapsed position. This inward fold prevents any impediment of the insertion process to the refuse bag 58. In the open position, the strap 42 retains the expanding arms apparatus 36 from opening too far.

To move the expanding arm apparatus 36 from collapsed position into expanded position, the hook handle 40 may be released from the striker handle 38. This allows the expanding arm apparatus 36 to spring open into expanded position.

Figure 7:
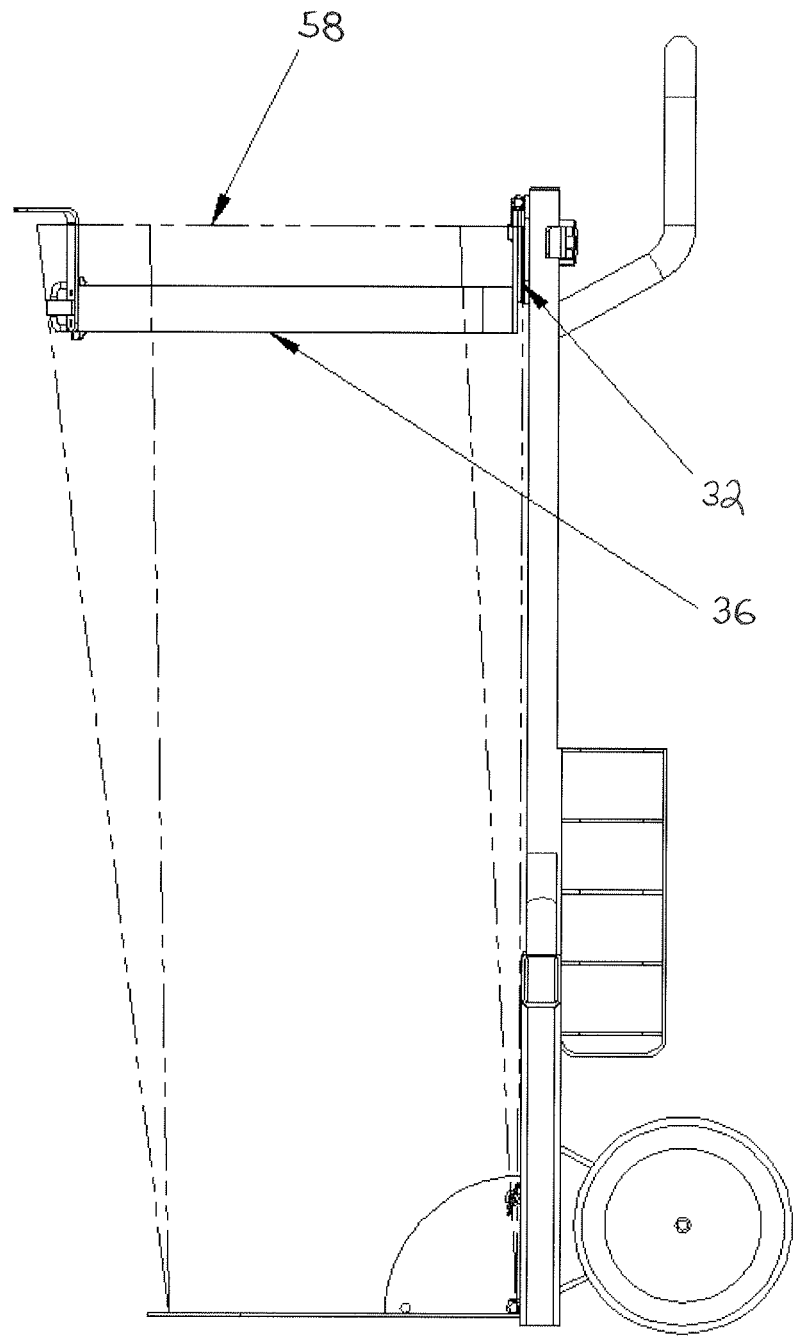
FIG. 7 illustrates a side view showing an embodiment of a refuse bag in work position, ready to receive lawn clippings, leafs or disposable yard debris.

FIG. 7 illustrates an elevation view of the bag holder, where the refuse bag 58 is held in the vertical, upright position and expanded by the bag opening apparatus 36, ready for deposit with lawn clipping, leafs or disposable yard debris.

Figure 8:
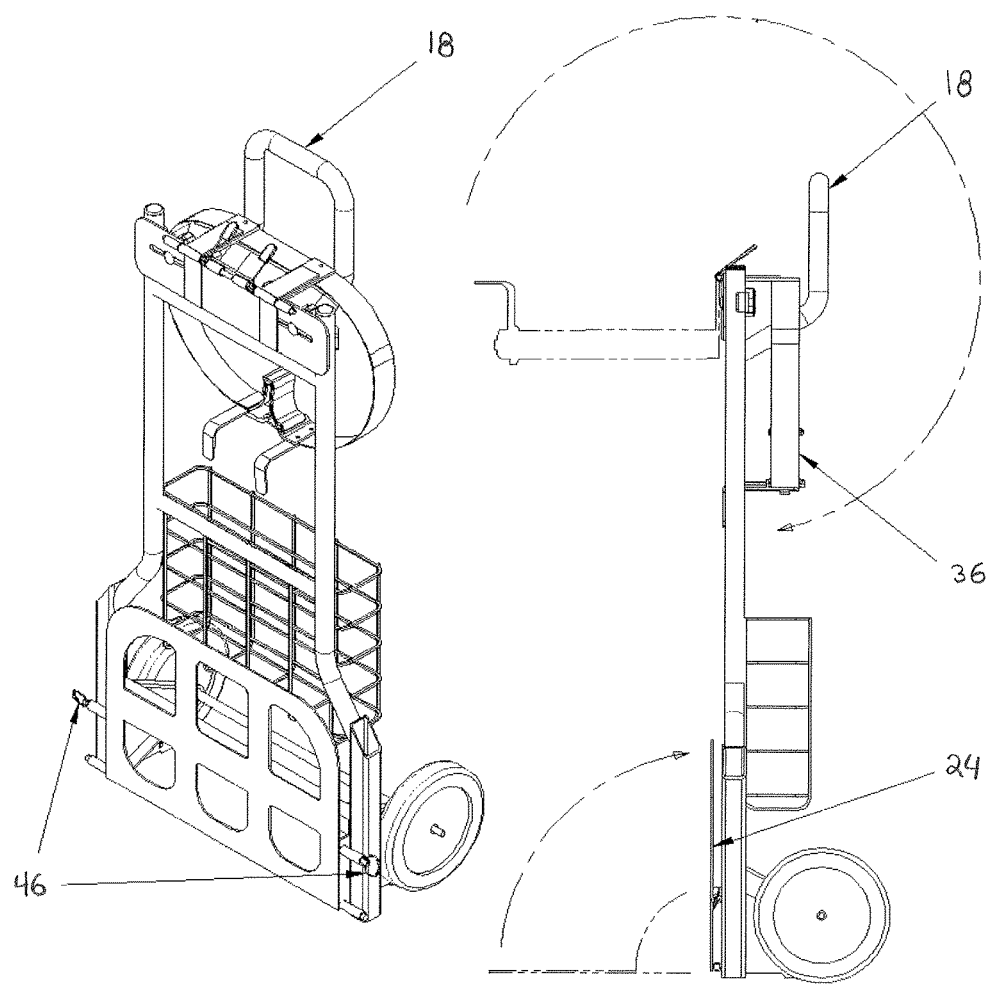
FIG. 8 illustrates a side view and an isometric view showing an embodiment of a refuse bag device in the storage position.

FIG. 8 provides two views of the bag holder in storage position. The expanding arm apparatus 36 is pivotable with respect the frame, as described above, and may fold over and to the back side of the cart, where it lies vertical and parallel to the cart. Gravity holds the expanding arm apparatus 36 in this position. The base plate 24 folds vertically and is held in position by the pins 46, on both sides. The entire assembly then can be can stored or can be hung by the handle 18 on a wall, with a hook.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A bag holder assembly comprising:
a clamp plate;
a hinge arm pivotally connected to the clamp plate;
an expanding arm apparatus connected to the hinge arm and moveable between an expanded position and a contracted position, the expanding arm apparatus comprising:
a first spring arm connected to a first end of the hinge arm;
a second spring arm connected to a second end of the hinge arm;
a latch connected to an end of said first spring arm opposite said hinge arm and configured to connect directly to a clasp located on an end of the second spring arm opposite said hinge arm;

a strap having a first strap end connection to the first spring arm end and a second strap end connection to the second spring arm end, wherein the first and second strap end connections are separate from the latch and clasp; and wherein the expanding arm apparatus is configured to move between a contracted position and expanded position, wherein the latch is connected to the clasp when in contracted position, and wherein the latch is disengaged from the clasp and the first and second spring arms are expanded away from one another when in expanded position; and wherein the first and second spring arms are configured to apply a biasing force to bias the expanding arm apparatus toward the expanded position.

2. The bag holder assembly of claim 1 further comprising a pre-clamp connected to the clamp plate, wherein the pre-clamp is pivotable with respect to the clamp plate and biased toward the clamp plate.

3. The bag holder assembly of claim 2, wherein the pre-clamp is configured to pivot in response to rotation of the hinge arm about the clamp plate.

4. The bag holder assembly of claim 1 wherein the strap is formed of a flexible material.

5. The bag holder assembly of claim 1 further comprising a mounting assembly configured to mount the clamp plate to a frame.

6. The bag holder assembly of claim 5, wherein the mounting assembly includes a clamp arm configured to provide adjustable clamping pressure to a portion of the frame.

7. The bag holder assembly of claim 1, wherein the hinge arm is configured to pivot up to 270 degrees of rotation.

8. A bag holder cart assembly comprising:

a cart comprising a frame;

a clamp plate connected to a portion of the frame;

a hinge arm pivotally connected to the clamp plate;

an expanding arm apparatus connected to the hinge arm and moveable between an expanded position and a contracted position, the expanding arm apparatus comprising:

a first spring arm connected to a first end of the hinge arm;

a second spring arm connected to a second end of the hinge arm;

a latch connected to an end of said first spring arm opposite said hinge arm and configured to attach directly to a clasp located on an end of the second spring arm opposite said hinge arm;

a strap having a first strap end connection to the first spring arm end and a second strap end connection to the second spring arm end, wherein the first and second strap end connections are separate from the latch and clasp; and wherein the expanding arm apparatus is configured to move between a contracted position and expanded position, wherein the latch is connected to the clasp when in contracted position, and wherein the latch is disengaged from the clasp and the first and second spring arms are expanded away from one another when in the expanded position.

9. The bag holder cart assembly of claim 8, wherein the first and second spring arms are configured to apply a biasing force to bias the expanding arm apparatus toward the expanded position.

10. The bag holder cart assembly of claim 8 further comprising a pair of wheels connected to the frame of the cart.

11. The bag holder cart assembly of claim 8 wherein the frame further comprises a base plate connected to a bottom portion of the frame, wherein the base plate is configured to support a bag thereon.

12. The bag holder cart assembly of claim 11, wherein the base plate is rotatable between a down position and an up position.

13. The bag holder cart assembly of claim 11 further comprising a first side plate positioned on a first side of the base plate and a second side plate positioned on a second side of the base plate.

14. The bag holder cart assembly of claim 8, wherein the latch comprises a striker handle and the clasp comprises a hook handle configured to attach to the striker handle.

15. The bag holder assembly of claim 8 wherein the strap is formed of a flexible material.

16. The bag holder assembly of claim 8 further comprising a basket connected to a portion of the frame.

17. The bag holder assembly of claim 8, wherein the clamp plate is adjustably connected to the frame by one or more clamp arms.

18. The bag holder assembly of claim 17, wherein a clamping pressure of the clamp arms is adjustable to allow for adjustment or removal of the clamp plate from the frame.

19. The bag holder assembly of claim 8, wherein the strap is configured to fold inward toward the interior of the expanding arm apparatus when the expanding arm apparatus is in the contracted position.

20. The bag holder assembly of claim 8 further comprising a pre-clamp pivotably connected to the clamp plate and biased toward the clamp plate.

* * * * *